United States Patent [19]

Ingels

[11] 3,744,960
[45] July 10, 1973

[54] FLUID ENVIRONMENT IN A TREATMENT ZONE

[76] Inventor: Glen R. Ingels, 9940 Memorial Drive, Houston, Tex. 77024

[22] Filed: May 8, 1972

[21] Appl. No.: 250,923

Related U.S. Application Data

[63] Continuation-in-part of Ser. No. 828,600, May 28, 1969, abandoned, which is a continuation-in-part of Ser. No. 597,291, Nov. 28, 1966, abandoned, which is a continuation-in-part of Ser. No. 292,280, July 2, 1963, abandoned.

[52] U.S. Cl. ............................................... 432/23
[51] Int. Cl. ............................................. F27b 9/16
[58] Field of Search ...................... 432/22, 24, 54; 148/16, 16.5, 16.7, 20.3

[56] References Cited
UNITED STATES PATENTS

| | | | |
|---|---|---|---|
| 1,923,145 | 8/1933 | Harsch | 432/21 |
| 2,504,320 | 4/1950 | Gamble | 432/21 |

*Primary Examiner*—John J. Camby
*Attorney*—James F. Weiler et al.

[57] ABSTRACT

The transfer of energy in a fluid environment in a treatment zone is closely controlled by carefully controlling the enthalpy of the incoming fluid environment and the enthalpy of the exhausting fluid environment. The enthalpy in the incoming fluid environment is controlled independently of the enthalpy of the treatment zone. The enthalpy in the exhausting fluid environment is controlled in response to the temperature of the exhausting fluid environment. Carbonaceous or inert material or both may be added to the fluid environment to control the temperature of the exhausting fluid environment. The fluid environment may be a saturated fluid mixture composed of liquid water saturated with a major amount of carbon dioxide, a minor amount of methane (which may be omitted), and lesser amounts of hydrogen and carbon monoxide at temperatures from about 32°F to about 160°F and at pressures up to the equilibrium pressure of water, 218.5 atmospheres. When using a saturated fluid mixture for the treatment environment, best results are obtained when the temperature of the exhausting environment is maintained within the range of about 212°F to about 1,500°F, the preferred ranges being for low water concentration mixtures from about 212°F to about 400°F and for higher water concentration mixtures from about 400°F to about 980°F. The method is applicable to other fluid environments, for example, inert gases, such as argon, or reducing gases, such as hydrogen, or nitriding gases, such as nitrogen, or carburizing gases, such as methane, or controlled fluid mixtures, such as endothermic or exothermic environments. A number of examples is set forth.

16 Claims, 8 Drawing Figures

Patented July 10, 1973
3,744,960
4 Sheets-Sheet 1
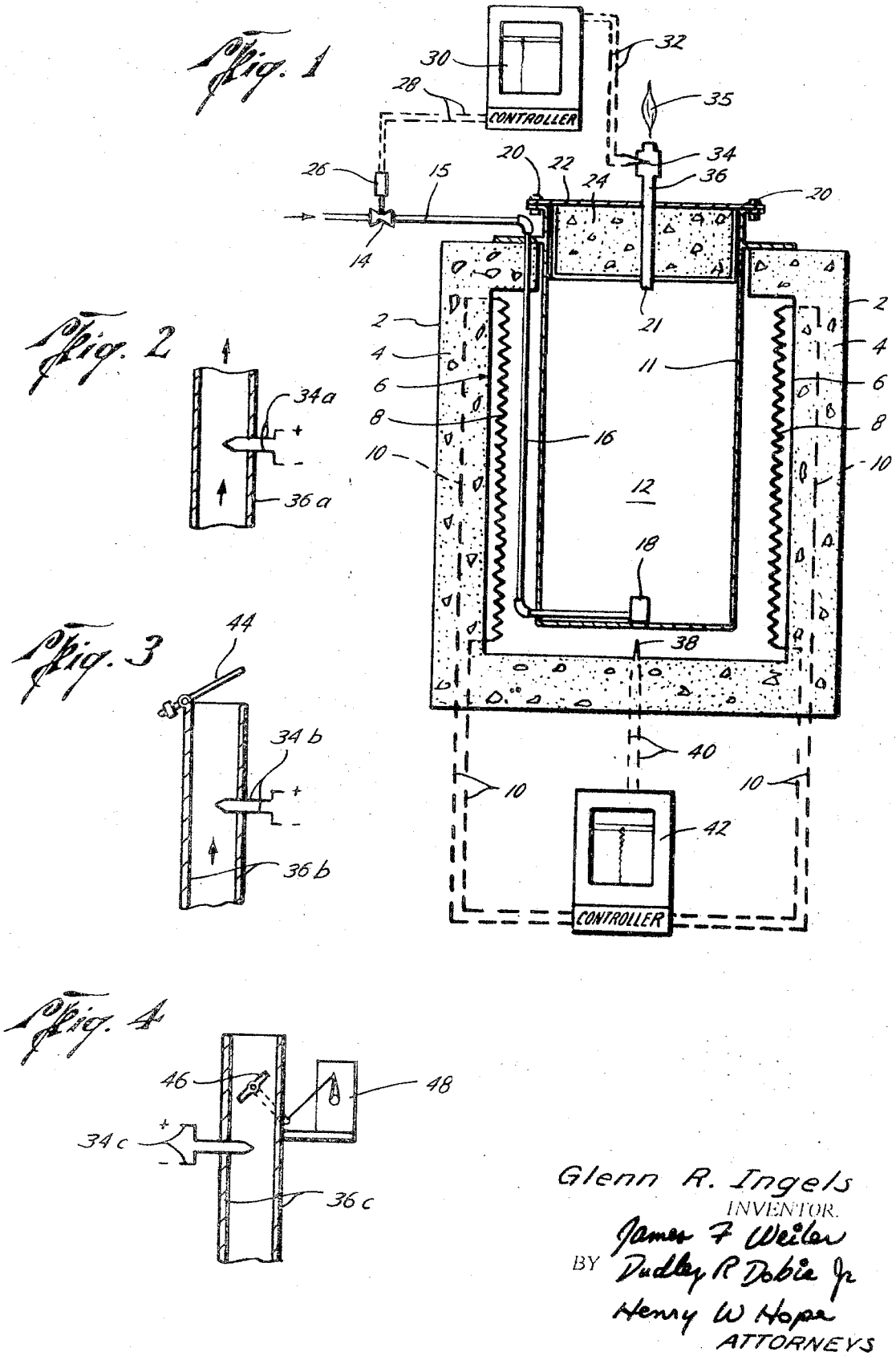
Glenn R. Ingels
INVENTOR.
BY James F Weiler
Dudley R Dobie Jr
Henry W Hope
ATTORNEYS

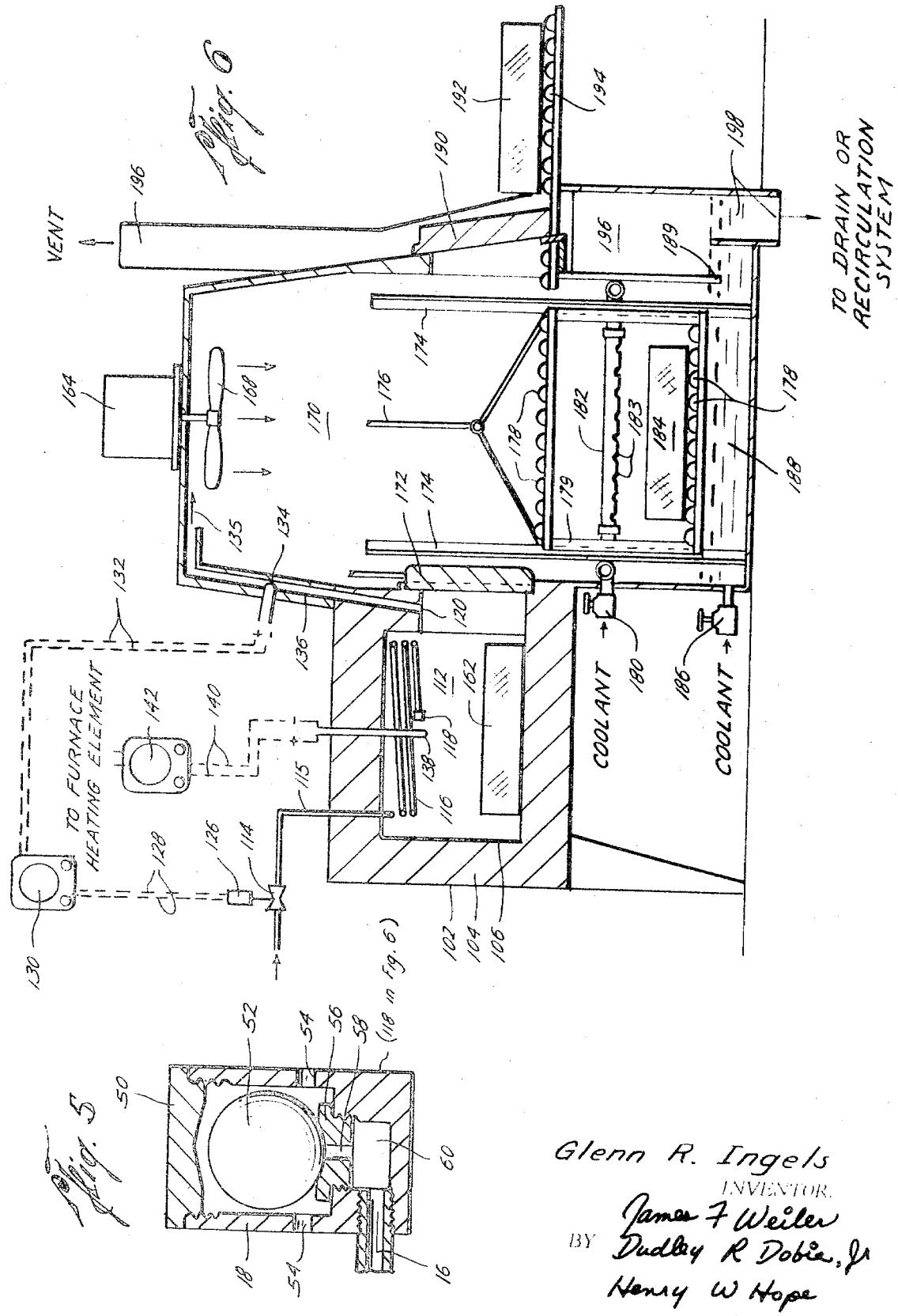

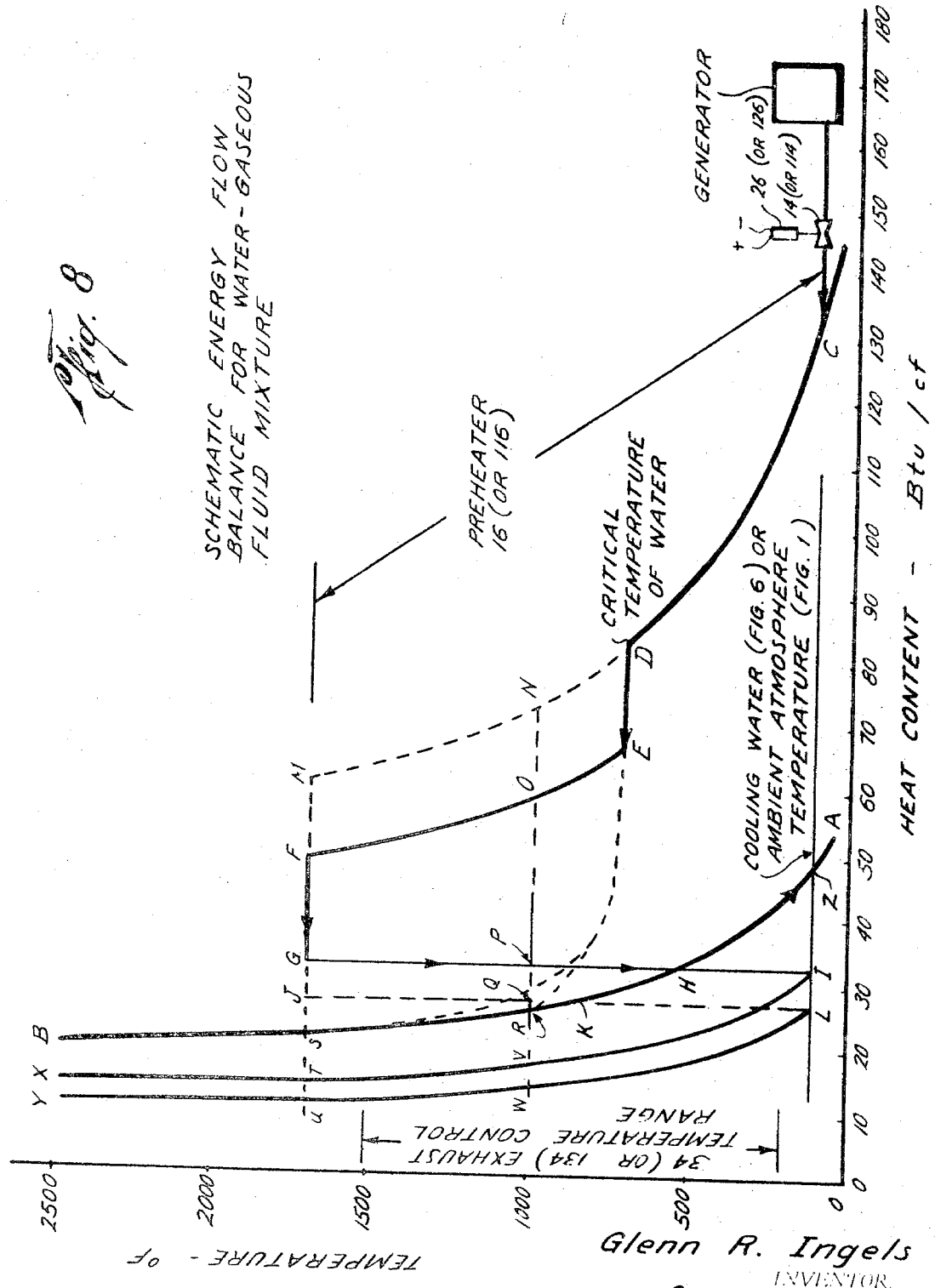

FLUID ENVIRONMENT IN A TREATMENT ZONE

CROSS REFERENCE TO RELATED APPLICATIONS

This application is a continuation-in-part of application Ser. No. 828,600 filed May 28, 1969, now abandoned which is a continuation-in-part of application Ser. No. 597,291 filed Nov. 28, 1966, now abandoned, Which is a continuation-in-part of application Ser. No. 292,280 filed July 2, 1963, now abandoned, in which restriction was required. Claims to other inventions disclosed and claimed herein are included in U. S. Pat. No. 3,539,165 granted Nov. 10, 1970 issued on application Ser. No. 833,308 filed June 16, 1969, which is a continuation-in-part of application Ser. No. 597,290, Nov. 28, 1966, abandoned, which is a continuation-in-part of application Ser. No. 292,280, July 2, 1963, abandoned; and continuation-in-part of application Ser. No. 590,290 filed Nov. 28, 1966, now abandoned, and Streamlined Continuation application Ser. No. 28,192 filed Apr. 4, 1970 of Ser. No. 719,613 filed Jan. 8, 1966, now U.S. Pat. No. 3,655,172, which is a continuation-in-part of application Ser. No. 604,515 filed Nov. 28, 1966, now abandoned which in turn is a continuation-in-part of application Ser. No. 292,280 filed July 2, 1963 now abandoned.

BACKGROUND OF THE INVENTION

The present invention relates to methods of controlling the transfer of energy in a fluid environment in a treatment zone. More specifically, the present invention relates to methods of transferring energy in a fluid environment in a treatment zone by carefully controlling the enthalpy of the incoming fluid environment and the enthalpy of the exhausting fluid environment. The methods are useful in the reduction, melting, heat treating, welding, cold treating, casting, surface treating, and the like of metallic and nonmetallic bodies by which advantageous properties in the material are obtained.

It has long been desired in the art to provide a method or system for treating metals and nonmetals in a suitable fluid environment by which very exact control conditions in the furnace are obtained so that desired properties can be imparted to these metals and nonmetals. In the metallurgical art until the present development, there was no method or system for treating metals and nonmetals in which the enthalpy of the incoming fluid environment, for example, the temperature and the pressure of the fluid environment are controlled in a preheater prior to entrance to the treatment zone of a furnace and the enthalpy of the exhausting fluid environment is controlled, for example, the temperature or energy level of the fluid exhausting from the treatment zone of the furnace is controlled, by which very exact control conditions in the furnace are obtained so that the desired energy of the fluid environment is transferred to the metals and nonmetals thereby imparting to them desired properties.

It also has been desired in the art to treat metals and nonmetals in a fluid environment which may be in equilibrium or neutral to them, may be oxidizing and decarburizing, oxidizing and carburizing, reducing and decarburizing or reducing and decarburizing under operating conditions.

The present invention is directed to such methods and treatment.

SUMMARY

The present invention relates to methods of controlling the transfer of energy in a fluid environment in a treatment zone by which highly desired properties are imparted to materials being treated. The present invention relates to methods of transferring energy in a fluid environment in a treatment zone by carefully controlling the enthalpy of the incoming fluid environment and the enthalpy useful in the reduction, melting, heat treating, welding, cold treating, casting, surface treating and the like of metallic and nonmetallic bodies by which advantageous properties in the bodies are obtained.

More particularly, the present invention relates to a method of treating metals and nonmetals in a furnace in the presence of a fluid environment, as hereinafter set forth, under very exact control conditions in the furnace obtained by controlling the enthalpy of the incoming fluid environment, for example, the temperature and pressure of the fluid environment before its entrance into the treatment zone of the furnace and by controlling the enthalpy of the exhausting fluid environment, for example, the temperature, or energy level, of the environment as it exhausts from the treatment zone of the furnace thereby controlling the energy released by the environment in the treatment zone which is thus available to control the reactions with the metallic and nonmetallic bodies being treated at the treatment temperature thereby imparting desired properties to the metals and nonmetals being treated. The furnace atmosphere or environment may be a generated fluid mixture composed of liquid water saturated with a major amount of carbon dioxide, a minor amount of methane (which can be omitted), and lesser amounts of hydrogen and carbon monoxide while in the temperature range of from about 32°F to about 160°F and while maintaining the solute gases under atmospheric pressures up to the critical pressure of water, which is 218.5 atmospheres. This generated saturated fluid mixture may be in equilibrium or neutral, may be oxidizing and decarburizing, may be oxidizing and carburizing, may be reducing and carburizing, or may be reducing and decarburizing by controlling the temperatures and pressures within the range mentioned during its generation. Also, the furnace atmosphere may be inert gases, such as argon and helium, or may be a reducing gas, such as hydrogen, or may be a nitriding gas, such as nitrogen, or carburizing gases, such as methane or controlled fluid mixtures, such as endothermic or exothermic environments.

The metals which may advantageously be treated with the method include all of the elements of the Periodic Table. The nonmetals include the oxides, sulfides, sulphates, silicates, phosphates, and carbonates of the elements of the Periodic Table.

It is therefore an object of the present invention to treat metals and nonmetals under very exact control conditions in the furnace by controlling the enthalpy of the gaseous environment just prior to entering the treatment zone and by controlling its enthalpy as it exhausts from the treatment zone.

A further object of the present invention is to treat metals and nonmetals in a gaseous environment composed of liquid water saturated with a high or major concentration of carbon dioxide, with or without a minor amount of methane and lesser amounts of hydrogen and carbon monixide to impart desired properties to the metals and nonmetals.

A further object of the present invention is the provision of an improved method of heat treating and cold treating of metallic and nonmetallic bodies in which the constituents of the furnace atmosphere at any given temperature are balanced out thereby establishing an equilibrium between the gases in the atmosphere and the composition of the bodies in the furnace and which balance is maintained as the furnace temperature changes.

A still further object of the present invention is the provision of an improved method of heat treating and cold treating metallic and nonmetallic bodies by balancing the furnace atmosphere to the body in the furnace and automatically maintaining this balance at all times as the furnace temperature changes.

Yet a further object of the present invention is the provision of an improved method of treating metallic and nonmetallic bodies by which new and unusual structures having highly advantageous properties are obtained in comparison to those obtained by present commercial treatments.

A still further object of the present invention is the provision of a method of treating metallic and nonmetallic bodies in a balanced atmosphere by which new and improved properties are imparted to the bodies.

Yet a further object of the present invention is the provision of an improved method for processing metallic and nonmetallic bodies, such as annealing, normalizing, hardening, tempering, carburizing, nitriding, surface coating, freezing and the like by which improved results are obtained.

A further object of the present invention is the provision of a method in which metallic and nonmetallic materials are treated in an atmosphere which has the characteristics or properties of being in equilibrium or neutral, oxidizing or decarburizing, oxidizing and carburizing, reducing and carburizing, or reducing and decarburizing.

A further object of the present invention is to control closely the release of heat energy or reaction energy or both within the treatment zone to obtain a desired heat balance for the bodies being treated.

It is a further object to control the energy balance in a treatment zone while treating metallic and nonmetallic materials by controlling the enthalpy of the environment during generation, prior to its entrance into the treatment zone, and finally as it exits from the treatment zone thereby controlling the heat energy or reaction energy released in the treatment zone at the treatment temperature (difference between the energy entering the treatment zone and the energy leaving the treatment zone) thereby imparting desirable properties to metallic or nonmetallic bodies. In this connection, for most metallic and nonmetallic bodies extremely close enthalpy control is desired, of the order of a few b.t.u.s per cubic foot.

A still further object of the present invention is the provision of a method of treating metallic and nonmetallic bodies in which the environment is preheated to a controlled heat content or enthalpy just prior to its use as a treating environment to provide an environment with an energy level equal to or higher than the energy level existing during treatment and in which the heat content or enthalpy of the environment is controlled on its exit from treatment thereby controlling the energy released by the environment surrounding the metallic and nonmetallic bodies during treatment by which advantageous properties are imparted to them.

A still further object of the present invention is the provision of an improved method of processing metallic and nonmetallic bodies by closely controlling the heat or reaction energy or both released to or by the environment to structures having highly advantageous properties are obtained in comparison to those obtained by methods of the prior art.

Other and further objects, advantages and features of the invention will be apparent from the following description of presently preferred embodiments of the invention, given for the purpose of disclosure.

BRIEF DESCRIPTION OF THE DRAWINGS

FIG. 1 is an elevation view, partly in section, illustrating a retort furnace useful in the invention for treating metallic and nonmetallic bodies;

FIG. 2 is a sectional view of an exhaust pipe to an environment of less than one atmosphere, such as found when a partial pressure is pulled on the exhaust, and containing an energy level sensing element, here shown as a thermocouple;

FIG. 3 is a sectional view similar to that of FIG. 2 illustrating an exhaust pipe from a treating zone to an environment of one atmosphere of pressure with a counter weight flapper valve, which may be omitted for some reactions, and an energy level sensing element;

FIG. 4 is a sectional view, similar to FIGS. 2 and 3, of an exhaust pipe from a treatment zone where control is maintained at a pressure higher than one atmosphere by a pressure control mechanism, here shown as a butterfly valve connected to a pressure control motor and an energy level sensing element controlling at an elevated pressure;

FIG. 5 is an elevational view, partly in section, of a back pressure relief valve which operates at th temperature of a treatment zone and releases the treating environment into the treatment zone only when a preset pressure level is reached;

FIG. 6 is an elevational view, partly in section, of a treating furnace, containing a treating chamber or zone connected to a cooling or quenching chamber or zone with an exhaust pipe between the treating and cooling chambers containing the energy level sensing element, such as illustrated in FIGS. 2-4, inclusive;

FIG. 8 is a schematic energy flow diagram for the saturated fluid mixture representing the energy flowing with preset conditions at the generator, preheater and ambient atmospheric pressures within the treating chamber and with changeable conditions of furnace control temperature and exhaust control temperature.

As previously mentioned, FIGS. 1, 2, 3, 4, 5 and 6 illustrate apparatus suitable for use in the method of the invention. It will be understood, however, that other apparatus may be used.

DESCRIPTION OF THE PREFERRED EMBODIMENTS

Figure 7:
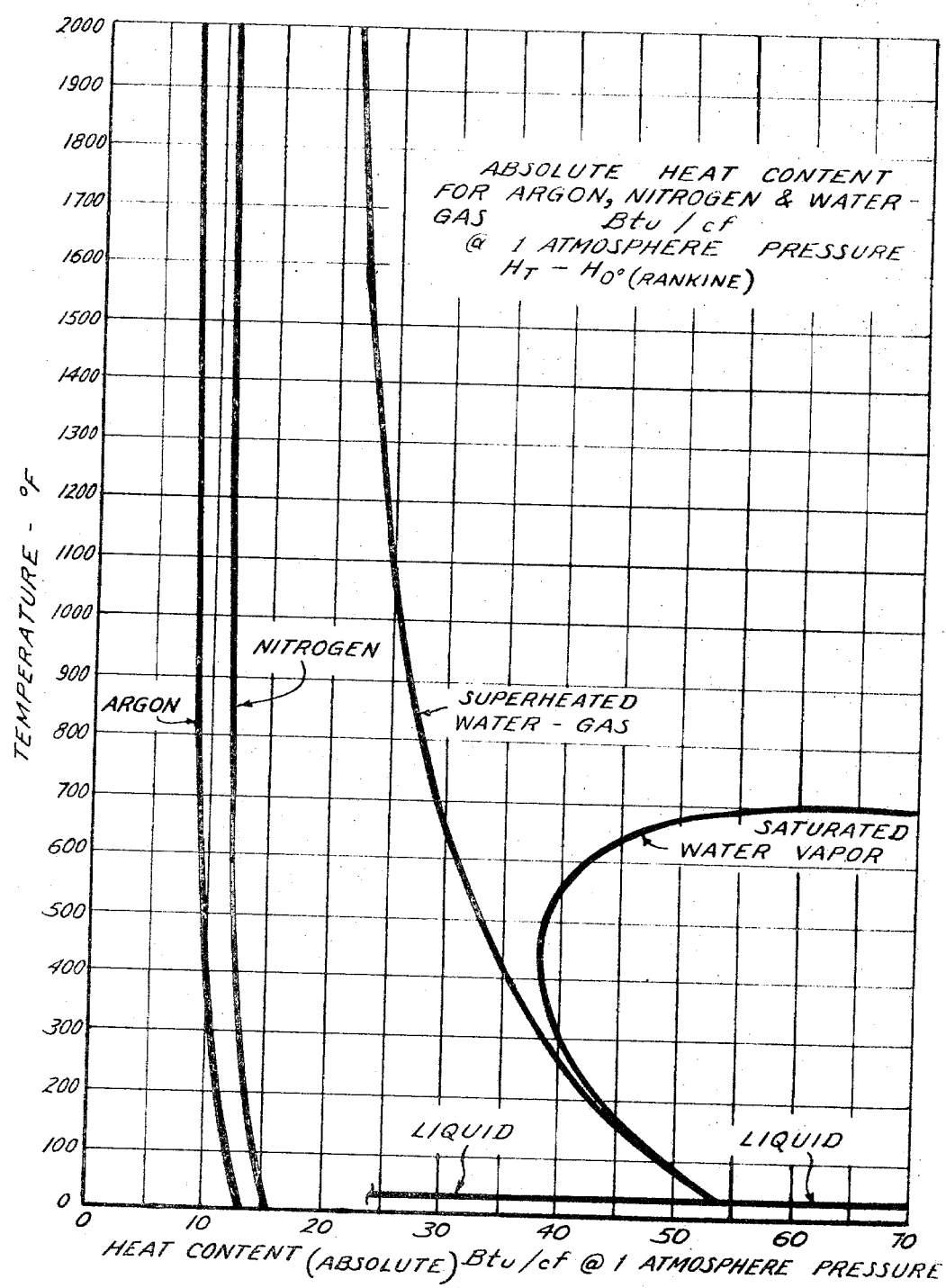
FIG. 7 is a graph presenting the absolute heat contents at one atmosphere of pressure of gaseous components of the staurated fluid mixture, the heat content of staurated water vapor, and the heat contents of argon and nitrogen.

In the art, previous efforts have not been directed to controlling the transfer of energy between the environment and the material being treated by carefully controlling the enthalpy of the environment before entry into the treatment zone and controlling the enthalpy of the environment exhausting from the treatment zone to impart desired properties to the material being treated.

Also, in the art, previous efforts have been directed to the elimination of the oxidizing gaseous constituents, such as carbon dioxide and water, in atmospheres for processing material at elevated temperatures. Surprisingly, however, a treatment environment having a high water content is extremely beneficial in treatment of metallic and nonmetallic bodies if the environment contains water balancing gases, carbon dioxide, carbon monoxide, hydrogen and methane while kept under very close control.

It has further been found that liquid water will act as a carburetor to absorb finite amounts of the water balancing gases to reach an equilibrium depending on the temperature and pressure of the solute water balancing gases over the water as explained in my co-pending Pat. Ser. No. 719,613. The reactions are according to the following water-gas reactions:

1. $CO_2 + H_2 = CO + H_2O$ + heat
2. $CO_2 + CH_4 = CO + H_2 + H_2O + C$ + heat The generated fluid mixture therefore constitutes liquid water balanced with the water balancing gases carbon dioxide, carbon monoxide, hydrogen and methane. The generated fluid mixture may have the characteristics or properties, depending on the temperature and pressure, of being in equilibrium or neutral, oxidizing and decarburizing, oxidizing and carburizing, reducing and carburizing, or reducing and decarburizing.

The generated fluid mixture, on leaving the generator, has a preset enthalpy characteristic with known properties, but which must be controlled throughout the process as the enthalpy requirement (heat) of equations (1) and (2) changes drastically with any change in temperature of the fluid mixture.

In one aspect of the process of the present invention, the enthalpy of the saturated fluid mixture is controlled by preheating under closely controlled temperature and pressure conditions, the metallic and nonmetallic materials are treated with the saturated fluid mixture in a treating chamber zone, and the enthalpy of the saturated fluid mixture or a portion thereof exhausting from the chamber or zone is closely controlled.

All materials, both metallic and nonmetallic, have a definite and finite energy requirement for each particular temperature level. Static heat energy from a heating furnace is not sufficient by itself to control these definite and finite energy requirements of metallic and nonmetallic bodies being treated. The heat content or enthalpy of the environment surrounding these materials during their treatment at any treatment temperature has a pronounced effect on their final properties. In the present method these energy requirements are provided and controlled.

To provide and control such environmental energy during treatment in the treating chamber an environment, which may be a fluid or fluid mixture, of known and predictable response to heating and cooling must be generated or provided, such as those illustrated in FIG. 7 to which reference is now made. The inert fluid argon is shown to have the lowest absolute heat content at all temperatures and will follow curve "Argon" on heating and cooling at 1 atmosphere pressure. The nitriding gas nitrogen is shown to have the next highest absolute heat content and will follow the curve marked "Nitrogen" on heating and cooling at 1 atmosphere pressure. The water-gas fluid mixture is shown to have the highest absolute heat content and will follow the curve marked "Superheated Water-Gas" on heating and coling at one atmospheric pressure. The liquid water will follow the curve marked "liquid" out to a maximum of approximately 100,000 Btu/cf at 40°F (not shown on graph) and dropping back to join the curve marked "Saturated Water Vapor" at the critical temperature of water 705.5°F at 1 atmosphere pressure (14.697 psia). To increase the heat content of each of these gases it is necessary to increase the pressure. For instance, to increase the heat content of argon at 400°F from 10 Btu/cf to 20 Btu/cf it is necessary to increase the pressure to 2 atmospheres or 29.394 psia. To increase the heat of the "Superheated Water-Gas" at 1,700°F from 22 Btu/cf to 61.5 Btu/cf it is necessary to increase the pressure to 2.8 atmospheres or 41.15 psia.

Reference is now made to FIG. 8 in which is illustrated schematic energy flow balance curve for the method of this invention using the fluid mixture water-gas as an environment. The fluid mixture here is shown to be generated at a temperature of 120°F and at a pressure of 41.15 psia; leaves the generator under control of flow control valve (14 in FIG. 1, 114 in FIG. 6) into the preheater (16 in FIG. 1, 116 in FIG. 6) and follows the curve C–D up to the critical temperature of water (705.5°F) where it will have a heat content of 82.25 Btu/cf at 1 atmosphere of pressure. If the furnace is being controlled at 1,700°F and the back pressure relief valve 18 on the preheater shown in FIG. 5 is set to hold 41 psia pressure the fluid mixture will follow curve D–N–M to 1,700°F. If the back pressure relief valve is set to hold 1 atmosphere of pressure the fluid mixture will follow curve D–F–S up to 1,700°F. If the furnace is being controlled at 1,000°F. the fluid mixture will follow curve D–N to 1,000°F, and D–E–R to 1,000°F, respectively. Thus a controlled heat content fluid or fluid mixture can be generated and supplied to the treating chamber.

Curve A–Z–H–K–R–S–B is the "Superheated Water-gas" curve on FIG. 7 and represents the heat content of the fluid mixture on heating and cooling at 1 atmosphere pressure. With the furnace being controlled at 1,700°F and the treating chamber at 1 atmosphere of pressure the fluid mixture on cooling would follow that portion of the curve S–R–K–H–Z. If the flow of the fluid mixture was increased to raise the temperature at the exhaust to H the rapid cooling from H to I would pull a partial pressure at the exhaust equivalent to I–T at I temperature level. If the flow of the fluid mixture was further increased to raise the exhaust temperature to K a greater partial pressure would be pulled on the exhaust equivalent to L–U at L temperature level. Thus, when the exhaust is controlled at K a greater quantity of energy would be released in the treating chamber than if the exhaust was controlled at H. Therefore, by the control of the energy entering the treating chamber through the preheater and by the exhaust control to control the energy leaving the treating chamber, control of the energy released in the treated chamber is obtained at any furnace temperature level.

This released energy is reactive energy capable of shifting equations (1) and (2) from an equilibrium or neutral state to one which is oxidizing and decarburizing, oxidizing and carburizing, reducing and carburizing, or reducing and decarburizing. Any of these combinations can be obtained and controlled by the methods and apparatus of this invention.

DESCRIPTION OF THE PREFERRED EMBODIMENTS

In one aspect of the invention a saturated fluid mixture is generated which comprises liquid water saturated with a major amount of carbon dioxide, a minor amount of methane and lesser amounts of hydrogen and carbon monoxide. Other components may be present. This is accomplished by saturating liquid water, while it is maintained at a temperature of from about 32°F to about 160°F while the gases are maintained from atmospheric pressure up to the critical or equilibrium pressure of water. The carbon dioxide of the liquid water may comprise the largest pure component percentage by volume of the generated fluid mixture. The generated fluid mixture composition has relatively low or minor amounts of hydrogen and carbon monoxide. Methane is present in minor amounts; although, there is more methane present than either hydrogen or carbon monoxide. If desired, the methane may be omitted The methods of the invention for preparing the saturated fluid mixture of the invention comprise saturating liquid water while maintaining it in the temperature range of about 32°F to about 160°F and under pressures up to the equilibrium pressure of water, which is 218.5 atmospheres. A preferred temperature of the liquid water is within the range from 105°F to 140°F with a constant pressure of the gases in the range of 25 to 80 psia. Particularly good results have been obtained by maintaining the liquid water at a temperature of the order of about 120°F with a constant gas pressure of the order of about 28 to 60 psia.

The gases which may be used to saturate the liquid water may be any combination of oxidizing and reducing or oxidizing and carburizing gases which will react to form in liquid water, within the temperature and pressure ranges specified, a high saturation of the water with carbon dioxide with a minor amount of methane, and with lesser amounts of hydrogen and carbon monoxide. Suitable gases for this purpose are mixtures of carbon dioxide and hydrogen or carbon dioxide and methane, or methane and oxygen, with or without combustion, which are presently preferred. If desired, additional carbon may be provided to the water in the form of charcoal, coke, graphite and the like for the purposes of stabilizing the oxidizing properties of carbon dioxide and water and the reducing and carburizing properties of methane. This additional carbon may be omitted. By controlling temperatures and pressures within the ranges set forth liquid water saturated with these gases is produced, which may be in equilibrium or neutral, may be oxidizing and decarburizing, may be oxidizing and carburizing or may be reducing and decarburizing. It is essential, however, that the saturated fluid mixture generated by the process be maintained in essentially its generated condition and transported to a treatment zone for treatment of metallic and nonmetallic materials in order to obtain the beneficial result of the present invention.

The metallic bodies subject to treatment by the generated saturated fluid mixture include all of the elements of the Periodic Table and their alloys, for example, steel, stainless steel, tungsten, molybdenum, vanadium and the like. The nonmetallic materials include the oxides, sulfides, sulphates, silicates, phosphates and carbonates of the elements of the Periodic Table.

By controlling the temperature and pressure the properties or characteristics of the generated saturated fluid mixture are controlled. For example, if the temperature of the liquid water is maintained at 50°F and the pressure of the gases is maintained at 10 psia, the generated saturated fluid mixture would have oxidizing and decarburizing properties. If the temperature of the liquid water were raised to 90°F, then the characteristics and properties of the generated saturated fluid mixture would be oxidizing and carburizing.

If the temperature of the water were maintained at 150°F and the gases at a pressure of 45 psia, then the generated saturated fluid mixture would have the properties of reducing and carburizing. If the temperature of the water is reduced to 90°F and the gases held at a pressure of 45 psia, the generated saturated fluid mixture would have the properties of reducing and decarburizing.

In practicing the methods of the invention, the gases may be flowed under controlled pressure into a chamber into intimate contact with liquid water in the chamber maintained from 32°F to 160°F with a gas head above the upper level of the water maintained at a pressure up to the equilibrium or critical pressure of liquid water, which is 218.5 atmospheres. When the gases cease to flow into the chamber, the liquid water is saturated and this may be used as an indication of such saturation. A saturated fluid mixture according to the invention has thus been formed and may then be discharged from the chamber, care being taken to maintain the properties and characteristics of the formed saturated fluid mixture on discharge from the chamber and transfer to a treating zone of chamber.

The following tables illustrate generated saturated fluid mixtures in which liquid water is saturated at the temperatures and pressures set forth with carbon dioxide, carbon monoxide, hydrogen and methane which were provided by mixtures of carbon dioxide and hydrogen, mixtures of carbon dioxide and methane, and mixtures of methane and oxygen, with and without combustion. These tables indicate the percentage of the pure components by volume saturating the water at the temperatures and pressures indicated.

TABLE I

The temperature of the water was maintained at 41°F and a constant pressure of the gases was maintained at 19.2 psia. The saturated fluid mixture had the following composition.

| PURE COMPONENT | PERCENTAGE BY VOLUME |
|---|---|
| $CO_2$ | 62.58% |
| CO | 1.38% |
| $H_2$ | .90% |
| $CH_4$ | 2.11% |
| $H_2O$ | 33.03% |
| Total: | 100.00 |

This saturated fluid mixture was reducing and decarburizing.

TABLE II

The temperature of the water was maintained at 41°F but the pressure was increased to 44 psia. The saturated fluid mixture had the following composition.

| PURE COMPONENT | PERCENTAGE BY VOLUME |
| --- | --- |
| $CO_2$ | 76.92% |
| $CO$ | 1.70% |
| $H_2$ | 1.10% |
| $CH$ | 2.60% |
| $H_2O$ | 17.68% |
| Total: | 100.00 |

This saturated fluid mixture was reducing and decarburizing.

TABLE III

The temperature of te liquid water was maintained at 122°F but the gas pressure was decreased to 19.2 psia. The saturated fluid mixture had the following composition.

| PURE COMPONENT | PERCENTAGE BY VOLUME |
| --- | --- |
| $CO_2$ | 38.36% |
| $CO$ | 1.42% |
| $H_2$ | 1.41% |
| $CH_4$ | 1.88% |
| $H_2O$ | 56.93% |
| Total: | 100.00 |

This saturated fluid mixture was oxidizing and carburizing.

TABLE VI

The temperature of the water was maintained at 122°F and the pressure of the gases was raised to 44 psia. The generated saturated fluid mixture had the following composition.

| PURE COMPONENT | PERCENTAGE BY VOLUME |
| --- | --- |
| $CO_2$ | 56.53% |
| $CO$ | 2.09% |
| $H_2$ | 2.08% |
| $CH_4$ | 2.77% |
| $H_2O$ | 36.53% |
| Total: | 100.00 |

This saturated fluid mixture was reducing and slightly carburizing.

TABLE V

The temperature of the water was maintained at 41°F and the pressure was raised to the pressure of 218.5 atmospheres. The generated saturated fluid mixture had the following composition.

| PURE COMPONENT | PERCENTAGE BY VOLUME |
| --- | --- |
| $CO_2$ | 93.16% |
| $CO$ | 2.06% |
| $H_2$ | 1.34% |
| $CH_4$ | 3.14% |
| $H_2O$ | .30% |
| total: | 100.00 |

This saturated fluid mixture was reducing and decarburizing.

TABLE VI

The pressure of the gas was maintained at 218.5 atmospheres and the temperature of the water was raised to and maintained at 122°F. This resulted in a saturated fluid mixture having the following composition.

| PURE COMPONENT | PERCENTAGE BY VOLUME |
| --- | --- |
| $CO_2$ | 88.36% |
| $CO$ | 3.27% |
| $H_2$ | 3.26% |
| $CH_4$ | 4.32% |
| $H_2O$ | .79% |
| total: | 100.00 |

This saturated fluid mixture was reducing and decarburizing.

TABLE VII

The following is a typical composition generated by a conventional endothermic generator in the art today.

| PURE COMPONENT | PERCENTAGE BY VOLUME |
| --- | --- |
| $CO_2$ | 0.40% |
| $CO$ | 19.60% |
| $H_2$ | 40.00% |
| $CH_4$ | .02% |
| $H_2O$ | .87% (dew point 43°F) |
| $N_2$ | 38.93% |
| total: | 100.00 |

It can be seen from the composition of this fluid mixture that it is very low in the water and water-forming consituents, carbon dioxide and methane. The composition is mainly carbon monoxide, hydrogen and nitrogen, which is strongly carburizing and decarburizing and not neutral, and which provides a very stable atmosphere which changes very little in pressure during changes in temperature and thus is not in equilibrium.

Referring now to FIG. 1 a heating furnace containing a retort for a treating chamber is illustrated. The heating furnace may be any conventional furnace, any type of shape and design. For example, the retort may be eliminated and gas heating means used in place of the electric heating means shown if provision is made for proper venting of excess combustion heating gases. As illustrated the furnace includes an outer shell 2 with insulation 4 and an inner shell 6 with any type of heating means, here shown to be electric with heating elements 8 connected by leads 10 to relays, not shown, common in the art to controller 42, actuated from thermocouple 38 through leads 40, which controls the temperature of retort 11 containing the metallic or nonmetallic bodies being treated (not shown) in treating zone 12. The saturated fluid mixture from a generator (not shown) or other fluid environment from a suitable source, not shown, enters through a proportional flow control valve 14 actuated by a proportional flow mechanism 26 common in the art, through a pipe 15 to preheater 16 which may be a single pipe, a series of pipes, straight or coiled, and connected to a back pressure control mechanism 18, which is open to the treating chamber 12 containing the bodies to be treated. The fluid or fluid mixture in the preheater may be heated to the temperature of the treating chamber 12 and at a controlled pressure from the pressure ambient within the treating chamber to a pressure equal to the critical pressure of water (218.5 atmospheres), as determined by the controlled setting on the back pressure regulator 18. When the saturated fluid mixture is at the controlled temperature and pressure (controlled enthalpy) it is expelled into the treating chamber 12 containing the metallic or nonmetallic bodies or parts to be treated, and out through exhaust pipe opening 21 through an exhaust pipe 36 containing a sensing device 34 to sense the enthalpy of the exhausting fluid or fluid mixture at point 34 in exhausting from the treating chamber. The enthalpy at 34 depends primarily on the internal energy, the volume and the pressure of the fluid or saturated fluid mixture at that point. Therefore, by controlling the flow of fluid or saturated fluid mixture at 14 a control of the enthalpy at 34 is obtained.

Now referring to FIG. 2, there is shown a section of the exhaust pipe to which the letter A has been added to like parts for convenience of reference. The exhaust pipe 36A contains the enthalpy sensing device 34A, here shown as a thermocouple, and is exhausting the fluid or fluid mixture to an environment of less than 1 atmosphere pressure. Thus, the enthalpy at 34A is being controlled at a partial pressure.

In FIG. 3 is shown a section of the exhaust pipe here give the letter B for like parts. The exhaust pipe 36B contains the enthalpy sensing device 34B and the counter weight flapper valve 44 to control the enthalpy at 1 atmosphere pressure at 34B.

FIG. 4 shows another modification of the exhaust pipe where the letter C has been added for like parts. Here the exhaust pipe 36C contains an enthalpy sensing device 34C operating at a pressure higher than 1 atmosphere controlled by the butterfly valve 46 through a pressure control mechanism 48 common in the art. Thus, the enthalpy level is being controlled at a higher pressure than 1 atmosphere.

FIG. 5 illustrates one means of a back pressure regulator designated as 18 in FIG. 1 and 118 in FIG. 6. This regulator operates at the temperature of the treating chamber to permit the fluid or fluid mixture to leave the preheater 16 (116 in FIG. 6) when the fluid or fluid mixture has reached the pressure set by a controlled weight pressing down on a controlled dimensioned area. The preheated fluid or fluid mixture from 16 (or 116 in FIG. 6) enters an opening 60 closed with a plug 56 having an orifice 58 of controlled dimension with a weight 52 pressing down on the orifice area 58, here shown as ball 52. This weight 52 may be of any shape or configuration. The known and controlled weight 52 pressing on a known and controlled orifice area 58 builds up a known and controlled pressure at 60. As the fluid or fluid mixture reaches the temperature of the treating chamber and at a pressure set by the weight 52 and orifice 58 combination it expels out into the treating chamber through openings 54 at a controlled enthalpy level.

In FIG. 6, to which reference is now made, is shown an elevational view, partly in section, of a treating furnace connected to a cooling or quenching chamber 170 by an exhaust pipe 136 and a closable door 172. The saturated fluid mixture from a generator (not shown) or other fluid environment from a suitable source or sources, not shown, enters through a flow control valve 114 and a pipe 115 into the preheater 116 located in the heated zone 112 of the furnace 102 and is expelled out through back pressure regulator 118 into the treating zone 112 of the furnace. A furnace thermocouple 138 controls the furnace temperature through leads 140 to a temperature controller 142 which actuates a heating means common in the art and not shown in the drawing. The fluid or fluid mixture in being expelled from the back pressure regulator 118 circulates in the treating zone 112 and flows out exhaust opening 120 through an exhaust pipe 136 in which is located an enthalpy sensing element 134, such as a thermocouple connected through leads 132 to a temperature controller 130 which actuates the proportional flow control valve 114. The fluid or fluid mixture on leaving the exhaust pipe 136 at 135 enters the cooling or quenching chamber 170. A blower fan 168 driven by a the motor 164 pulls a partial pressure at the exhaust 135 and pushes the hot fluid or fluid mixture down toward the cooling water 188 which cools and thereby contracts its volume and moves out under a baffle 189 to an overflow 198 to a drain or re-circulating system, not shown. The gases not absorbed pass out through a vent 196. The proportional flow of the fluid or fluid mixture is controlled by the enthalpy at 134 controlled through the flow control valve 114 in the inlet pipe 101. The temperature of the cooling water 188 may be regulated by a control valve 186 to hold approximately 90°F. A temperature control mechanism, common in the art, and not shown, may be utilized to operate a control valve 186 to hold a constant temperature of the cooling water 188. A spray pipe 182 is equipped with the nozzles 183 to spray quench the hot parts 184 if so desired by opening the coolant valve 180.

With the furnace being controlled at a desired temperature and the flow of fluid or fluid mixture through the flow control valve 114 being controlled by the exhaust controlled thermocouple 134 to hold a constant temperature in the range of 250°F to 1,500°F a desired energy balance flow is established according to FIG. 8, and the metallic materials are ready to be treated in the new and unique environment of this invention. The parts are loaded on suitable trays or baskets 192 resting on a roller conveyor 194, or any other suitable means of conveyances. The cooling chamber door 190 is raised, or a water spray curtain may replace door 190, and the work load 192 is pushed into chamber 170 onto hearth 178 attahced to an elevator 179, here shown to have a double hearth, but a single hearth may be used. The furnace door 172 is raised, and work is pushed to 162 through the opened door 172 which is then closed. If elevator 79 has a double hearth, as shown, a second work load 192 can be rolled on hearth 178 and elevator 179 raised by any convenient means 176. The upper hearth with its load is in the hot part of the cooling chamber and is being preheated, while the lower hearth 178 is empty. The furnace control 142 is maintaining a constant temperature in the treating chamber 112, and the exhaust control 134 controls the release of the reactive energy from the environment. After a given processing time, the door 172 is raised and the hot work 162 is pulled to the lower hearth 176 of the elevator 179 and the elevator 179 is lowered to its cooling position, while the preheated work on the upper hearth 178 of elevator 179 is pushed to 162 in the treating chamber and the door 172 is closed. The cooling chamber door 190 is then raised and another work load 192 is pushed onto the upper hearth 178 of the elevator 179, and the cooling chamber door 190 is again closed. After the work on the lower hearth 178 is cooled the elevator 179 is raised and the cooled processed work is pulled from the furnace back to 192 and down the processed line, not shown. The cycles may be repeated in production Runs.

No details have been given of the various controllers, thermocouples, valves and the like as these are all conventional and are readily available.

The following examples are illustrative of the beneficial effect of treating metals and non-metals with the saturated fluid mixture and other fluids according to the invention.

EXAMPLE I

In this example parts made of N.E. 8620, a carburizing grade of steel, was treated in a furnace similar to FIG. 6 following the energy flow curve of FIG. 8. The liquid water in the generator was saturated with a mixture of carbon dioxide and methane gas at a pressure of 41.5 psia and controlled at a temperature of 120°F. The back pressure regulator 118 was set to hold a pressure of 33.5 psia on the preheater. The low control valve 126 was manually operated and was set to provide an exhaust temperature of 840°F at 134. The cooling water was manually controlled to hold a temperature of 90°F. The furnace temperature was 1,700°F.

The parts carburized under these conditions showed a carbon content of 0.96 percent and with a case of depth of 0.080 inches. Examination of the carburized cases indicated the structures were fine grain, completely free oF free carbides, and retained austenite. The overall structures was more dense and finer grained as compared to parts carburized in a conventional manner. Testing the parts in a laboratory bearing testing machine showed the wearing surfaces to hold up 16–18 hours with 0.010 to 0.020 inches wear before final failure of the carburized surface. Other of the same parts when given the same treatment in the presence of a conventional endothermic type of atmosphere held up only 12–14 hours with 0.010 to 0.020 inches wear before final failure of the carburized surfaces.

EXAMPLE II

In this example a study was made of the affect of the saturated fluid mixture on the nonmetallic inclusions contained within a commercial grade of S.A.E. 1040 steel. Examination of steel prior to the test indicated the non-metallic inclusions were of the oxide and silicate type with ratings of approximately No. 3 to No. 4 on the A.S.T.M. rating chart. After treatment in the saturated fluid mixture with the exhaust being controlled at a temperature of 730°F and with other conditions as described in Example I there was a reduction of these non-metallic inclusions bringing the A.S.T.M. ratings up to No. 1 to 2.

The same steel when given the same treatment in the presence of the conventional endothermic type of atmosphere showed no change in the size, shape or number of nonmetallic inclusions.

EXAMPLE III

In this example a study was made of the effect of the exhaust temperature control on the treatment of metallic and nonmetallic bodies. The fluid, argon, was used for an environment because it is inert and will not react with the parts being treated. Any reactions found in the metallic or nonmetallic bodies would be due to the enthalpy of the environment as controlled by the preheater and the exhaust control. The samples were made from a medium carbon steel, known in the trade as D6ac.

A retort furnace similar to that shown in FIG. 1 with the preheater 16 but without the back pressure regulator 18, was connected at 1 to an argon cylinder carrying 150 psig pressure through regulators common in the art to deliver a constant pressure of 20 psig at 14. The flow of the argon through the valve 14 was manual and the exhaust temperature sensed by thermocouple 34 was recorded on a chart on the recorder 30.

With the retort 12 being controlled at 1,600°F by thermocouple 38 through controller 42, the inert gas argon was fed through valve 14 into the treating chamber 12 and out through the exhaust opening 21, the exhaust pipe 36 containing the thermocouple 34 and recording on recorder 30, the exhaust pipe 36 being connected through a flexible pipe to a hose maintained under water to give a constant back pressure of 2 ounces/sq. inch--gage (2.0 psig), not shown. With the argon flow being manually controlled to record an exhaust temperature of 200°F on the recorder 30 by the flow of 18 cubic feet of argon per hour the D6ac steel was held at temperature for 1 hour time. Thereafter, the retort 11 was allowed to cool with the argon still flowing. As the treating chamber 12 cooled the flow of argon had to be increased to hold the exhaust temperature 34 at 200°F. For instance the retort 12 at 1,400°F requirPd a flow of 20 cfh, at 1,200°F required 25 cfh, and at 1000°F required a flow of 30 cfh. When the retort was cooled to room temperature the lid 22 was removed by loosening the nuts 20 and the D6ac parts examined by a hardenss check and microscopic studies. Under the microscope the surface showed a nonmentallic oxide layer of scale, with an undernPath layer of decarburized metal to a depth of 0.008. The evidence was clear that too low an enthalpy had been maintained by the exhaust being controlled at 200°F and the preheater operating at the retort 12 pressure, to prevent the metallic material changing to the lower heat balance nonmetallic oxide of the pure elements.

EXAMPLE IV

In this example the exhaust temperature control was raised to 600°F with all other conditions as described in Example III. In this test with the treating chamber 12 at 1,600°F the flow of argon was 55 cfh to maintain an exhaust temperature of 600°F. As the treating chamber cooled the flow of argon was changed to hold the 600°F exhaust temperature as follows: at 1,400°F the required flow of argon was 62 cfh to hold the 600°F exhaust temperature, at 1,200°F the flow had to be increased to 74 cfh, while at 1,000°F the flow was further increased to 91 cfh to hold the 600°F exhaust temperature.

On examination the D6ac was completely free of any non-metallic oxide and any decarburization. No carburization was present because unlike the saturated fluid mixture of this invention argon cannot carburize. The enthalpy of the environment surrounding the work in the treating chamber had been maintained at a good level for the medium carbon D6ac steel.

EXAMPLE V

In this example the exhaust temperature control was raised further to 1,000°F with all other conditions as described in Example III. With the treating zone 12 controlled at a temperature of 1,600°F the flow of argon had to be 92 cfh to obtain an exhaust temperature of 1,000°F. As the treating chamber 12 was cooled the argon flow had to be increased as follows: treating zone 12 at 1,400°F the argon flow had to be increased to 105 cfh, at 1,200°F the required argon flow was 124 cfh, at 1,000°F the argon flow had to be 152 cfh.

On examination the D6ac steel was free of any nonmetallic oxides but has a very serious decarburized surface with evidence that the internal structure had an imbalance of energy. Very fine grinding of the sample would start an exothermic release of this imbalance in energy and the specimen would get very hot. This is evidence that the enthalpy control of the environment surrounding work being treated by the control of the exhaust temperature is of paramount importance in the processing of metallic and nonmetallic bodies.

EXAMPLE VI

In this example a saturated fluid mixture was used. The gases used in saturating the liquid water were air from a central air compressor storage at about 120 psia combined with a synthetic mixture of hydrocarbon gases composed mainly of methane and propane.

Both the air and the hydrocarbon gases had their pressures adjusted and balanced to apply a head pressure of 44psia. The saturated fluid mixture flowed through the flow controlled valve 14 (FIG. 1) into the preheater 11 and into the treating zone 12 and out through the exhaust 21 in which was placed the thermocouple 34 to measure the heat content, or the energy level of the generated environment. With the furnace controlled at a temperature of 1,550°F and showing an exhaust temperature of 425°F the following samples were tested:
1. Shim stock 0.010 thick —for carbon potential determinations.
2. Pure iron with less than 0.02 percent contained carbon
3. S.A.E. 1018 —a low carbon steel
4. S.A.E. 4340 —a medium carbon, high alloy steel
5. S.A.E. 52100 a high carbon tool steel.

The samples were run for 2 hours in the furnace and pulled with tongs and water quenched. The results of the tests on these samples showed the fluid mixture under the above conditions to be reducing and with controlled carburizing/decarburizing potential of 0.60 percent carbon.

EXAMPLE VII

In this example, vanadium oxide ore containing 41.98 percent oxygen was run in the manner explained in Example VI with the exception that the time in the furnace was for 12 hours. In this treatment the nonmetallic ore was reduced by approximately 98.0 percent of the contained oxygen. The sample was found to be clean and free of all soot.

The same nonmetallic ore run in the same manner in presence of the conventional endothermic type of atmosphere was found to have been reduced only 24.6 percent and with a pick-up of carbon soot.

EXAMPLE VIII

In this example pure tungsten powder of 99.98 percent purity was converted to tungsten carbide when treated in a furnace in the presence of a saturated fluid mixture. The powder was exposed for a period of 18 hours to the furnace temperature controlled at 1,880°F. The saturated fluid mixture was generated in a generator, not shown. In this example, the gas used in saturating the liquid water was carbon dioxide and methane. The saturated fluid mixture, under control of the rate of flow, moved to the preheat coil 11 located in the treating zone 12 of the furnace, into the treating zone 12 of the furnace, and out the exhaust 21 in which was located the thermocouple 34 to measure the heat content or energy level of the exhausting gases. With the exhaust running at 840°F the gaseous mixture had a heat content of 50 Btu/cf.

Examination of the treated tungsten powder showed the material to be free of soot, and on analysis showed the tungsten to have been converted to a tungsten carbide containingg 1.78 percent carbon.

The same tungsten run in the same manner in the presence of the conventional endothermic type of atmosphere was found to be sooted up without the formation of any tungsten carbide.

EXAMPLE IX

In this example, iron oxide ore containing 29.6 percent oxygen and ground to a particle size of 30 to 80 mesh was treated in a furnace controlled at a temperature of 1,700°F with the exhaust gases controlled at 600°F in the presence of the eaturated fluid mixtute of Table IV. After the ground ore was exposed for a period of 12 hours to the furnace temperature of 1,700°F in the presence of the saturated fluid mixture, the furnace was cooled to below 800°F with the exhaust gases still maintained at a temperature of 600°F. All controls were then shut off and the furnace system was allowed to cool to room temperature.

An examination of the furnace system showed no sooting with clean, reduced particles. Analysis of the particles indicated the oxygen content to be 1.3 percent. The treatment of the iron ore oxide in the saturated fluid mixture had removed 95.8 percent of the oxygen in the iron oxide ore.

The same iron oxide ore was treated in the furnace under the same conditions as previously indicated in the presence of the endothermic type atmosphere of Table VII. After the test runs, the furnace system had a heavy soot deposit and the iron oxide ore contained 21.4 percent oxygen, or a removal of only 27.7 percent of the oxygen from it.

The following tables illustrate the flow of argon and nitrogen to hold exhaust temperature as indicated.

TABLE VIII

Argon flow, in cubic feet per hour 77°F, required at 1 to hold exhaust temperature at 34 (or 134) when the treating zone 12 (or 112) is controlled as shown.

| Treating Zone Temperature at 12 (or 112) °F | Exhaust Temperature Control 34 (or 134) °F | Argon Flow at 9 enector to hold exhaust temperature at 34° (or 134) cfh at 77°F |
|---|---|---|
| 1000 | 200 | 30 |
|  | 400 | 60 |
|  | 600 | 91 |
|  | 800 | 120 |
|  | 1000 | 152 |
| 1200 | 200 | 25 |
|  | 400 | 48 |
|  | 600 | 74 |
|  | 800 | 98 |
|  | 1000 | 124 |
| 1400 | 200 | 20 |
|  | 400 | 42 |
|  | 600 | 62 |
|  | 800 | 84 |
|  | 1000 | 105 |
| 1600 | 200 | 18 |
|  | 400 | 36 |
|  | 600 | 55 |
|  | 800 | 73 |
|  | 1000 | 92 |

TABLE IX

Nitrogen flow, in cubic feet per hour (77°F) required at 1 to hold exhaust temperature at 34 (or 134) when the treating zone 12 (or 112) is controlled as shown.

| Treating Zone TemPerature at 12 (or 112) °F | Exhaust Temperature Control 34 (or 134) °F | Nitrogen Flow at generator to hold Exhaust temperature at 34 (or 134) cfh (77°F) |
|---|---|---|
| 1000 | 200 | 21 |
|  | 400 | 42 |
|  | 600 | 63 |
|  | 800 | 84 |
|  | 1000 | 108 |
| 1200 | 200 | 17 |
|  | 400 | 34 |
|  | 600 | 51 |

|      |      |    |
|------|------|----|
|      | 800  | 68 |
|      | 1000 | 85 |
| 1400 | 200  | 15 |
|      | 400  | 28 |
|      | 600  | 43 |
|      | 800  | 57 |
|      | 1000 | 72 |
| 1600 | 200  | 12 |
|      | 400  | 24 |
|      | 600  | 37 |
|      | 800  | 49 |
|      | 1000 | 61 |

The foregoing examples are representative and similar results may be obtained when treating any of the elements of the Periodic Table and their alloys or their oxides, carbides, silicates, sulfides, sulphates, phosphates and carbonates.

EXAMPLE X

In this example the effect of energy control of an environment was determined under the following conditions: an environment was used similar to that shown in Table VII in which the gases of the water-gas reaction were saturated with water at approximately 43°F; the counter balance flapper 44 of FIG. 3 was removed from the exhaust 36b giving exhaust conditions similar to that of FIG. 2; and the back pressure weight 52 of the regulator of FIG. 5 was removed permitting operation at a pressure slightly higher than atmospheric.

A furnace similar to the one shown in FIG. 6 was used without the cooling chamber 170. The exhaust 136 was open to the atmosphere. A flow valve, a mercury bulb temperature sensing device and controller actuating the flow valve were used to control the exhaust temperature by the control of the flow of gases into the treating chamber. The mercury temperature sensing bulb 134 was placed in an offset in the exhaust 136 in order to avoid any radiant heat from the treating chamber 112 striking the sensing bulb 134. These devices are common and readily available. For example, these devices were Partlow Model 60 Flow Control Valve, Partlow Indicator 194–100/650°F, with 665 BSP 220–10 Piston-Pak, with one-half inches -21SST-105.

Shim stock, 1 inches × 6 inches × 005 inches thick, containing 0.08 percent carbon were used as specimens. The treating chamber 112 was controlled by separate instrumentation at a temperature of 1,550°F. Duplicate shims, wired together, were placed in the treating chamber 112 and held for 30 minute periods and were then water quenched in each of the following tests. Carbon analysis of both shims was made and the average of the two were found as follows:

| Exhaust Temperature Control — °F | % Carbon |
|---|---|
| 350 | 0.079 |
| 365 | 0.078 |
| 370 | 0.041 |
| 380 | 0.036 |
| 390 | 0.017 |
| 400 | 0.269 |

The samples were all found to be free of oxidation, but were dead soft. It can be seen that without the counter balance flapper 44 of FIG. 3 decarburization can be controlled as well as carburization by the temperature exhaust control. The reaction follows, in reverse, equation (2) of page 9 and the equilibrium curves presented in the original patent applications, Ser/No. 292,280, FIG. 1 and its Continuation-in-Part Ser./No. 597,291, FIG. 1, both now abandoned in favor of this application.

EXAMPLE XI

With the furnace and exhaust temperature control operating as described in Example X, a nitriding test was run. The exhaust temperature control was set to hold a temperature of 390°F at 134 in the exhaust. Ammonia, from a cylinder, was fed through a flowmeter into the furnace. With the ammonia flowing at a rate of 25 cubic feet per hour, and the endothermic gas flow controlled at a rate to hold an exhaust temperature of 390°F at 134 the shims were placed in the treating chamber 112, held for 30 minutes and water quenched.

On examination the shims had evidence of having been nitrided. They were file hard, but could take some bending prior to breaking. The evidence was clear that during the process of decarburization in the presence of a nitriding gas a nitrided case was formed. It was further evident that this nitrided case had more ductility than the nitrided case common in the art formed by prior processes.

The same test was run with the treating chamber 112 being controlled at 1,040°F instead of the 1,550°F. Here, again, the shims had evidence of being nitrided. Thus, by controlling the exhaust in accordance with this invention, both alpha and gamma iron can be made to take a nitrided case.

EXAMPLE XII

In this example the effect of energy control of an environment was determined under the following conditions: the endothermic gas of Table VII was fed through the flow control valve 114,126 of FIG. 6, but before entering the treating chamber 112 the gases were made to flow through a water bath to saturate the gases of the water-gas reaction with water; the counter balance flapper 44 of FIG. 3 was placed back on the exhaust; and the back pressure weight 52 of the regulator of FIG. 5 was left out permitting operation at pressure just slightly higher than atmospheric.

The exhaust temperature control functioned in the same manner as described in Example X. The temperature of the water bath started out at approximately 60°F, but with the exhaust 134 being controlled at 390°F the water bath stabilized out at approximately 120°F. The heating of the water bath occurred from the backing up of heat from the treating chamber 112 through the inlet pipe 115 of FIG. 6.

With the counter balanced flapper 44 of FIG. 3 on the exhaust the reaction was forward and was again carburizing at the following exhaust temperatures:

| Exhaust Temperature Control — °F | % Carbon |
|---|---|
| 350 | 0.237 |
| 360 | 0.338 |
| 370 | 0.602 |
| 380 | 0.992 |
| 390 | 1.420 |
| 400 | 1.226 |

The evidence is clear that by controlling the energy of the exhausting environment the thermodynamic energy of the environment is changed in a controlled manner.

EXAMPLE XIII

This example illustrates the effect of the preheater and the temperature exhaust control of this invention on an environment such as methane in the treatment of nonmetallic material. Methane, being a compound of carbon and hydrogen, readily decomposes at temperatures above 1,020°F. The carbon formed can either be graphitic or gaseous depending on the enthalpy, or heat content, of the decomposition. The hydrogen can be molecular and/or atomic.

The furnace used was similar to that shown in FIG. 1 with the following imposed conditions: commercial available natural gas (methane) at 4 to 5 psig was used as an environment after it was pressure boosted to 150 psig by a gas booster pump, common in the art; the counter balance flapper 44 of FIG. 3 was on the exhaust 36b; and the ball weight 52 of FIG. 5 was replaced with a bar of steel, 1 inches diameter by 31.75 inches long. This weight pressed down on an orifice 58 which was 0.250 inches in diameter. This back pressure regulator 18 was designed to permut flow of the methane environment into the treatment zone 12 only after a pressure of 144 psig had been reached in the preheater 16 at the temperature of the treatment zone 12.

The nonmetallic material used as samples was the iron ore described in Example IX. It was used because a supply of this ore was readily available and the processing of iron ore is of great economic importance in the metallurgical art. Any of the nonmetallic materials can be processed in the same manner of these examples, such as the oxides, sulfides, sulphates, silicates, phosphates and carbonates of the elements of the Periodic Table, as previously mentioned.

The treating chamber 12 was controlled at 1,700°F by instrumentation 42, while the exhaust temperature 34 was controlled by a thermocouple actuating a motorized L & N Control Valve through an L & N Proportional-Controller. The temperature was set to control the exhaust 34 at 360°F by the control of the flow of the methane environment through the motorized control valve 14.

A handful of the nonmetallic iron ore was placed in a basket and lowered into the treating chamber 12 and the lid resealed on the chamber. In a short period of time the flame 35 began to change color to a bright yellow indicating that a reaction with the nonmetallic oxide was taking place.

After approximately 2 hours reaction time the basket with its sample was removed from the treating chamber 12 and was oil quenched to stop all reactions. The sample was then treated to remove all traces of oil from the particles prior to testing.

On visual examination the particles had taken on a bright, lustrous appearance entirely different from the dull black appearance of the nonmetallic oxide. On smashing the particles on an anvil with a hammer it was revealed that the particles were now malleable, bright metallic material.

A chemical analysis of the particles indicated that they had lost most of the oxide and now contained 0.26 percent carbon dissolved in the gamma iron. Under the microscope no evidences of carbon as graphite could be seen.

Thus, the reaction was reducing and carburizing by preheating the methane environment and controlling the enthalpy of the methane environment while exhausting.

When using envionments containing water, such as a saturated fluid mixture, best results are obtained by maintaining the exhaust temperature within the range of about 212°F to about 1,500°F, the preferred ranges being from about 212°F to about 400°F for low water concentration mixtures and from about 400°F to about 980°F for higher water concentration mixtures.

No more examples are set forth as by simple experimentation optimum conditions can be determined for various environments, the material being treated and the results desired.

It is apparent from the foregoing that the present invention is well suited and adapted to attain the objects and ends and has the features and advantages mentioned as well as other inherent therein.

While presently-preferred embodiments and examples have been given for the purpose of disclosure, many changes may be made therein and the invention may be applied to many additional uses and materials to obtain desired properties in various materials which are within the spirit of the invention as defined by the scope of the appended claims.

What is claimed is:

1. A method of controlling the transfer of energy in a fluid environment in a treatment zone comprising,
   flowing the fluid environment into the treatment zone;
   exhausting the fluid enivronment from the treatment zone, and
   controlling the enthalpy of the fluid environment before flowing into the treatment zone independently of the treatment zone.

2. The method of claim 1 including,
   controlling the enthalpy of the fluid enviroment before flowing into the treatment zone to produce a predetermined enthalpy in the fluid environment at least equal to that of the fluid environment exhausting from the treatment zone.

3. The method of claim 1 including,
   controlling the enthalpy of the fluid environment exhausting from the treatment zone in response to its temperature.

4. The method of claim 3 including,
   controlling the enthalpy in the fluid environment entering the treatment zone to produce a predetermined enthalpy in the fluid environment before flowing into the treatment zone at least equal to that of the fluid environment exhausting from the treatment zone.

5. A method of altering the properties of materials in a treatment zone comprising,
   flowing into the treatment zone and about the material a fluid environment selected from the group consisting of liquid water saturated with a major amount of carbon dioxide, a minor amount of methane, and lesser amounts of carbon monoxide and hydrogen, and liquid water saturated with a major amount of carbon dioxide and lesser amounts of carbon monoxide and hydrogen, while maintaining the temperature of the water from about 32°F to about 160°F and under pressure from ambient atmospheric to 218.5 atmospheres while flowing into the treatment zone, and
   exhausting the fluid environment from the treatment zone.

6. The method of claim 5 including,
   controlling the temperature of the fluid environment exhausting from the treatment zone between about 212°F and about 1,500°F in response to its temperature while exhausting.

7. The method of claim 5 including, controlling the temperature of the fluid environment exhausting from the treatment zone within the temperature range of about 212°F to about 400°F in response to its temperature while exhausting.

8. The method of claim 5 including,
controlling the temperature of the fluid enviornment exhausting from the treatment zone within the temperature range of aboFt 400°F tO about 980°F in response to its temPerature while exhausting.

9. The method of claim 6 including,
controlling the enthalpy in the fluid environment to produce a predetermined enthalpy therein before flowing into and independently of the treatment zone.

10. The method of claim 6 including,
controlling the enthalpy in the fluid environment to produce a predetermined enthalpy therein at least equal to that of the exhausting fluid environment before flowing into and independently of the treatment zone.

11. A method of treating material whose properties are altered thereby comprising,
generating a fluid environment selected from the group consisting of liquid water saturated with a major amount of carbon dioxide, a minor amount of methane, and lesser amounts of carbon monoxide and hydrogen, and liquid water saturated with a major amount of carbon dioxide and lesser amounts of carbon monoxide and hydrogen while maintaining temperature of the water from 32°F to about 160°F and under pressure from atmospheric to 218.5 atmospheres,
flowing the generated fluid environment to a treatment zone while retaining the properties of the generated saturated fluid,
introducing the generated fluid environment into the treatment zone and about the material thereby providing a fluid environment about the material in the treatment zone during treatment, and
exhausting the fluid environment from the treatment zone.

12. The method of claim 11 including,
controlling the temperature of the fluid environment exhausting from the treatment zone within the temperature of from about 212°F to about 1,500°F in response to its temperature while exhausting.

13. The method of claim 11 including,
controlling the temperature of the fluid environment exhausting from the treatment zone within the temperature range of from about 212°F to about 400°F in response to its temperature while exhausting.

14. The method of claim 11 including,
controlling the temperature of the fluid enviornment exhausting from the treatment zone within the temperature range of from about 212°F to about 980°F in response to its temperature while exhausting.

15. The method of claim 11 including,
controlling the enthalpy in the fluid environment to produce a predetermined enthalpy therein before flowing into and indepen:ently of the treatment zone.

16. The method fo claim 11 including,
controlling the enthalpy in the fluid environment to produce a predetermined enthalpy therein at least equal to that of the exhausting fluid environment before flowing into and independently of the treatment zone.

* * * * *

UNITED STATES PATENT OFFICE
CERTIFICATE OF CORRECTION

Patent No. 3,744,960                    Dated  July 10, 1973

Inventor(s)  Glen R. Ingels

It is certified that error appears in the above-identified patent and that said Letters Patent are hereby corrected as shown below:

On title page, item [76] inventor's name reads "Glen R. Ingels". It should read -- Glenn R. Ingels --

Column 2, line 10, "and the enthalpy useful in the reduction" should read -- and the enthalpy of the exhausting fluid environment and is especially useful in the reduction --

Column 3, line 58, "b.t.u.s." should read -- b.t.u.'s --

Column 4, line 9, "to structures having highly advantageous" should read -- to the bodies at treatment temperatures by which new and unusual structures having highly advantageous --

Column 4, line 18, "elevation" should read --elevational --

Column 6, line 7, "coling" should read --cooling --.

Column 6, line 37, "D-F-S" should read --D-E-S --

Column 9, line 24, "Table VI" should read -- Table IV --

Column 11, line 61, "by a the motor" should read -- by the motor --

Column 12, line 68, "low" should read --flow--

Column 14, line 3, insert "(18 cfh)" after "per hour"

Column 14, line 15, "undernPath" should read -- underneath--

FORM PO-1050 (10-69)

Certificate of Correction
Patent No. 3,744,960
Page 2

Column 14, line 16, "0.008" should read -- .008 --

Column 15, line 15, "0.010" should read -- .010 --

Column 16, line 33, "hour 77° F" should read -- hour @ 77° F--

Signed and sealed this 20th day of August 1974.

(SEAL)
Attest:

McCOY M. GIBSON, JR.
Attesting Officer

C. MARSHALL DANN
Commissioner of Patents